United States Patent [19]

Lark

[11] 4,268,645
[45] May 19, 1981

[54] POLYESTER RESIN COMPOSITION

[75] Inventor: John C. Lark, St. Charles, Ill.

[73] Assignee: Standard Oil Company (Indiana), Chicago, Ill.

[21] Appl. No.: 133,149

[22] Filed: Mar. 24, 1980

[51] Int. Cl.[3] .................... C08G 63/76; C08F 283/00
[52] U.S. Cl. .................... 525/437; 428/395; 528/296; 528/300; 528/302; 528/308
[58] Field of Search ............... 525/437; 528/296, 300, 528/302, 308; 428/395

[56] References Cited

U.S. PATENT DOCUMENTS

| | | | |
|---|---|---|---|
| 3,548,026 | 12/1970 | Weisfeld et al. | 260/40 R X |
| 3,652,502 | 3/1972 | Jackson et al. | 260/33.4 R X |
| 3,931,422 | 1/1976 | Bateman et al. | 260/9 X |
| 3,981,833 | 9/1976 | Lark | 260/9 |
| 4,058,496 | 11/1977 | Holda et al. | 528/296 X |
| 4,080,316 | 3/1978 | Holda et al. | 528/296 |

*Primary Examiner*—Lucille M. Phynes
*Attorney, Agent, or Firm*—William C. Clarke; William T. McClain; William H. Magidson

[57] ABSTRACT

A composition suitable for warp sizing polyester and polyester/cotton yarns comprising water soluble polyester resin having (1) a backbone portion comprising the reaction product of dihydroxy compound having a maximum molecular weight of 250 and dicarboxylic acid compound wherein the acid number of said backbone portion is less than 3 and (2) internal and pendant carboxylic acid moieties comprising an aromatic polycarboxylic acid compound having at least 3 acyl moieties which provides from 5 to 75 equivalent percent of the acyl moieties in the polyester, the said polyester resin having a molecular weight within the range of from 5000 to 35000 and an acid number within the range of from 15 to 55.

24 Claims, No Drawings

POLYESTER RESIN COMPOSITION

BACKGROUND OF THE INVENTION

The field of this invention relates to a novel polyester composition and to utilizing a novel polyester composition as a warp size suitable for polyester and polyester cotton blends.

PRIOR ART

In the production of textile materials, it is necessary to apply a coating or size to the fibers to protect them from abrasion during the various operations involved in the formation of the cloth. The coating of size must be flexible, tough and normally capable of removal by conventional desizing techniques. The flexibility and toughness necessities are obvious since the fibers, threads or filaments are twisted and bent in various directions and rub against the loom parts. In general, the size must be readily soluble in an aqueous system (dilute aqueous alkali, for example) or else readily digestible by appropriate enzyme desizing agents. Glass fibers can be desized by burning the size off, provided the burnt off size yields a light colored or preferably white ash.

In the case of the so-called hydrophilic fibers, such as cotton, the most commonly used warp sizing agent is starch. This natural polymer is used in many forms, such as the hydrolyzed starches, the dextrins, and the partially etherified or esterified starches. Also, in the case of cotton, such polymers as water-soluble carboxymethyl cellulose, water-soluble hydroxyethyl cellulose and the various natural gums (guar gum, gum arabic, sodium alginate, etc.) have been used.

These warp sizing agents offer little protection to yarn prepared from the so-called hydrophobic fibers, such as nylon, polyesters (polyethylene terephthalate), polyacrylonitrile, cellulose esters (cellulose acetate), fiber glass, etc. This is because the applied coatings do not adhere tenaciously to the hydrophobic fiber and are therefore scraped away by abrasion.

A large number of synthetic fiber sizing agents, which are either water-soluble or dilute alkali-soluble, have been employed to size these hydrophobic fibers with variable success. These fiber sizing agents include polyacrylic acid, partially hydrolyzed polymers of acrylonitrile and/or lower alkyl acrylate, maleic anhydride copolymers, maleic acid half-ester copolymers, polyvinyl alcohol, etc. However, some of these materials are not readily compatible with or do not adhere well to textile yarns and thus do not form a protective coating or film thereon. Other materials cover the yarn but do not impart more than a slight degree of abrasion resistance. Still other materials while coating the yarn in a satisfactory manner, are removed from the woven fabric only with considerable difficulty and expense. Therefore, a need exists for sizing compositions which avoid the above-mentioned disadvantages.

In U.S. Pat. No. 3,546,008 there is disclosed non-crystalline polyesters that contain a hydrophobic moiety and a hydrophilic moiety. The sizing preparation comprises linear, water-dissipatible polyesters derived from at least one dicarboxylic acid component, at least one diol component wherein at least 20 mole percent is a poly (ethylene glycol) and a difunctional monomer containing a —$SO_3M$ group attached to an aromatic nucleus wherein M is hydrogen or a metal ion. A preferred composition is prepared from isophthalic acid, the sodium salt of 5-sulfoisophthalic acid and diethylene glycol. This composition acts as if it were partially soluble in water and partially insoluble. U.S. Pat. No. 3,563,942 teaches solvent-soluble linear copolyester compositions suitable for coating applications which are dispersible in aqueous mediums, the water dispersibility being achieved by the addition to the copolyesters of 1-2% (molar) of the metal salt of a sulfonated aromatic compound. The linear copolyesters are formed by condensing at least dicarboxylic acids and approximately equimolar equivalents of one or more dihydric alcohols. To insure linearity, each of the starting materials is difunctional. A preferred copolyester is formed from ethylene glycol and either terephthalic acid and sebacic acid equivalents or terephthalic, isophthalic and sebacic acid equivalents with sodium dimethyl-5-sulfoisophthalate.

Other water-dispersible and water-dissipatable polyesters containing metal salt groups are known which are used as adhesives, coating materials including sizing materials, films and other products. Such polyesters are described in U.S. Pat. No. 3,779,993, U.S. Pat. No. 4,156,073 and U.S. Pat. No. 3,385,811. U.S. Pat. No. 4,156,073 also teaches polyfunctional acids such as trimellitic anhydride, and pyromellitic acid as useful in the preparation of the linear polyesters.

In the prior art, coating compositions comprising prepolyesters of diols and dicarboxylic acids in turn reacted with trimellitic acid are known. U.S. Pat. No. 3,548,026 teaches coating compositions prepared from a diol and a dicarboxylic acid to form a prepolyester which in turn is reacted with trimellitic anhydride in a mole ratio to form a linear polyester having a molecular weight range based on a prepolyester molecular weight to 2000 to 10,000, the anhydride moieties being terminal in the polyester chain. U.S. Pat. No. 3,652,502 teaches carboxylated linear polyesters having linear chains from polyester forming constituents including a trihydric alcohol having a secondary hydroxyl group which is esterified with a di-or tricarboxyl-containing anhydride such as trimellitic anhydride to give a carboxylated linear polyester, which is substantially free of cross-linkages. Cross-linked products are taught as undesirable. Acid number determinations of free carboxyl groups are used to confirm presence of such groups. Examples 1, 3 and 4 teach acid numbers of 32.5, 64.5 and 21.5, indicating presence of unreacted carboxyl groups. U.S. Pat. No. 3,981,833 teaches a composition suitable for warp sizing polyester/cotton yarns comprising starch and water soluble polyester resin having (1) a backbone portion having an acid number from 0 to 25, which comprises the reaction product of polyhydroxy compound having at least 3 oxyethylene units and dicarboxylic acid compound wherein 20 to 75 percent of the hydroxy group are provided by a polyoxyethylene glycol having at least 3 oxyethylene groups and (2) pendant carboxylic acid moieties comprising a polycarboxylic acid compound having at least 3 acyl moieties. The preparation of a prepolyester is taught as having an acid number of 0 to 25 to provide a polyester with an acid number of 35 to 70.

U.S. Pat. No. 3,931,422 teaches a polyester/starch paper sizing which comprises degraded starch and a substantially linear polyester of polyhydric alcohol and a trimellitic acid compound, said polyester having an average molecular weight under about 4000 and with terminal trimellitic groups providing an acid number of at least 35. The trimellitic anhydride compound provides from 10 to 100 equivalent percent of the acyl groups in the polyester. Example I teaches a mole ratio of prepolyester to trimellitic anhydride of approximately 3:2, wherein moles of prepolyester diol are greater than moles of trimellitic anhydride.

The polyester compositions of my invention are the esterification product of (1) a preformed polyester derived from a dicarboxylic acid with a stoichiometric excess of a diol; this prepolyester is substantially hydroxyl terminated with little or no terminal carboxyl groups and (2) a reactive component containing two anhydride groups or at least one anhydride group and at least one carboxylic acid group.

The stoichiometric ratio of the dicarboxylic acid diol in preparation of the prepolyester and the stoichiometric ratio of the prepolyester to the anhydride compound are critical to obtain the required selective reactivity and molecular weights of the prepolyester and polyester. Mole ratios of dicarboxylic acid to diol are required within the range of from about 4:5 to 1.0:1.01. Mole ratios of polycarboxylic acid compound to prepolyester are required within the range of from about 5:4 to about 1.01:1.0. Use of mole ratios of the dicarboxylic acid to diol within the range of 4:5 to 6:7 causes the softening point of the prepolyester to be above 180° F. Use of ratios below 4:5, such as 2:3, causes the prepolyester to form as a gel which is not reducible into water and is liquid above 350° F. Use of moles of prepolyester to moles of trimellitic anhydride within of 4:5 to 1.0:1.01 causes the calculated molecular weight of the resulting polyester to be in the intermediate weight range of from approximately 5000 to 35000. Use of ratios wherein moles of prepolyester are greater than moles of trimellitic anhydride causes increased cross-linking of excess hydroxyl groups with concurrent increased gellation. A preferred composition comprises trimellitic anhydride (TMA) wherein the mole ratio of trimellitic anhydride to prepolyester is in the range of from 7:6 (1.166 moles TMA:1.0 moles polyester diol) to 1.01:1.0 (1.01 mole TMA:1.0 mole polyester diol), 20:19 (1.0-1.1 moles TMA:1.0 moles polyester diol) being preferable.

The aforementioned stoichiometric mole ratios are necessary to produce polyesters of the required molecular weight (i.e., above 5000) to obtain the necessary toughness and flexibility for use as a polyester warp sizing. It has been found that use of ratios other than the above ratios produced polyester molecular weights which resulted in polymers which were either too brittle or of a gel-like nature with poor abrasion resistance. On the other hand, if a linear polyester is produced by the esterification of a diol with a dicarboxylic acid or its anhydride in the aforesaid mole ratios and required molecular weight to prepare a linear prepolyester, followed by a fusion reaction of an anhydride with the linear prepolyester, the resulting polyester is a non-linear polyester with reacted anhydride groups within the polymer chain wherein unreacted carboxyl moieties are pendant from the backbone, the chain is terminated by acid moieties with unreacted carboxyl groups at the chain end, and the molecular weight is within the range of from 5000 to 35000.

Accordingly, in the prior art, the preparation of polyesters is taught comprising a diacid and diol to form a polyester which thereupon is reacted with a polycarboxyl aromatic compound to form a carboxylated polyester. However, significant differences are present in the prior art from the composition of the present invention. The present invention comprises a non-linear warp sizing polyester wherein the polyester carboxyl:hydroxyl ratio is at least one and is preferably greater than one, the carboxyl groups are pendent from the backbone of the polyester and also terminate the chain, the diol required to form the prepolyester has a maximum molecular weight of no more than 250 and has no more than one oxyethylene group, and the molecular weight of the polyester is in the intermediate weight range of 5000 to 35000, the molecular weight resulting from the stoichiometric ratios of the reactants.

Accordingly, it is an object of the present invention to provide sizing compositions for polyester and polyester/cotton fibers, fibrous articles sized therewith and processes for sizing said fibers and fibrous articles. Another object of this invention is to provide sizing compositions for textile yarns, especially those yarns made from linear polyesters. Still another object is to provide sizing compositions which will adhere to and bind together the several filaments of textile yarns. Still another object is to provide sizing compositions which will impart abrasion resistance to textile yarns during weaving. Another object of this invention is to provide sizing compositions which can be removed from textile yarns by scouring. Other objects of this invention will appear herein.

The objects of this invention can be attained with compositions comprising water-soluble polyester resins having (1) a backbone portion comprising the reaction product of a diol of a maximum average molecular weight of 250 and an aromatic dicarboxylic acid compound and (2) internal and pendant carboxylic acid moieties comprising an aromatic polycarboxylic acid compound having at least three acyl moieties wherein said polycarboxylic acid compound having at least three acyl moieties provides from 5 to 75 equivalent percent of the acyl moieties in the polyester. The properties of the polyester warp sizing are controlled by the mole ratio of the polyester prepolymer to the mole ratio of the aromatic polycarboxylic acid compound having at least three acyl moieties. If the ratio is less than 5:4 moles of aromatic polycarboxylic acid to moles of prepolymer polyester, the molecular weight of the polyester is too low and the coating tends to be too hydrophilic, lacks film strength and does not adhere well to the polyester and polyester/cotton yarns. A high ratio of the aromatic polycarboxylic acid compounds is necessary to obtain a warp size with optimum adhesion to the polyester and polyester/cotton yarns. The pendant carboxyl groups are responsible for the dispersibility of the polyester resin in the aqueous coating bath and the removability of the warp size after weaving in suitable alkaline desizing baths.

SUMMARY OF THE INVENTION

A composition suitable for warp sizing polyester and polyester/cotton yarns comprising water soluble polyester resin having (1) a backbone portion comprising the reaction product of dihydroxy compound and dicarboxylic acid compound wherein the acid number of said backbone portion is less than 3 and (2) internal and pendant carboxylic acid moieties comprising an aromatic polycarboxylic acid compound having at least 3 acyl moieties which provides from 5 to 75 equivalent percent of the acyl moieties in the polyester, the said polyester resin having a molecular weight within the range of from 5000 to 35000 and an acid number within the range of from 15 to 55.

DETAILED DESCRIPTION OF THE INVENTION

The polyester resins of the instant invention are suitable for application from aqueous media on commercial textile machinery used in weaving polyester and polyester/cotton yarns. Preparation of these polyester aromatic dicarboxylic acid resins of intermediate molecular weight (over 5000) is based upon the production of a linear prepolyester diol from aromatic dicarboxylic acid and glycol in a mole ratio of about 4:5 followed by the controlled coupling of this prepolymer diol with a polyacyl compound. The mole ratio of aromatic polycarboxylic acid to prepolymer is at least 5:4, preferably 20:19.

The properties of the polyester resin are dependent upon the ratio of linear polyester diol to polyacyl compound in the second stage. The polyacyl compound reacting as an effective diacid in the second stage yields a non-linear polymer with unreacted carboxyl groups pendant from the polymer chain. The preferred prepolyester is an isophthalic acid and diethylene glycol diol. The preferred polyacyl compound is trimellitic anhydride.

Briefly, the water-soluble polyester resins useful in this invention can be produced by reacting substantially all of the dihydroxy components and all of the dicarboxylic acid components to form the backbone linear polyester having an acid number of less than 3 and then a polycarboxylic acid compound having at least 3 acyl moieties is condensed to form a non-linear polyester resin having an acid number of at least 15, preferably 15 to 55.

It is essential that dihydroxy compounds useful in this invention contain an alkylene group of at least 2 carbon atoms and are dihydroxyl compounds such as alpha, omega alylene glycol containing 2 to 12 carbon atoms (e.g. ethylene glycol, trimethylene glycol, tetramethylene glycol, dodecamethylene glycol, etc.), 1,2-alkylene glycols containing 3 to 12 carbon atoms (e.g. 1,2-propylene glycol, etc.), 1,3-alkylene glycols (e.g. neopentyl glycol), dihydroxydialkyl ethers (e.g. diethylene glycol, etc.) with a maximum average molecular weight of 250. Diols with molecular weights greater than 250 provide polyesters which are too soft for use in commercial equipment. Polyhydroxy compounds containing 3 to 6 hydroxy groups such as 1,1,1-trimethylol ethane, 1,1,1-trimethylol propane, glycerol, 1,2,6-hexanetriol, pentaerythritol, sorbitol, etc., cannot be used as non-linear prepolyesters result.

Suitable aromatic dicarboxylic acid compounds in the backbone portion of the polyester resin include benzene dicarboxylic acid compounds such as phthalic acid, phthalic anhydride, isophthalic acid, terephthalic acid, etc; naphthalene dicarboxylic acid, particularly the 2,6 dicarboxylic acid, etc. Up to 50 equivalent percent of the acyl equivalents in the backbone portion of the polyester can be provided by saturated aliphatic and cycloaliphatic dicarboxylic acids such as adipic acid, sebacic acid, suberic acid, dimer acid, etc. which provide additional flexibility to the polyester resin coatings.

Suitable polycarboxylic acid compounds having at least three carboxyl or more acyl groups include trimellitic anhydride, trimellitic acid, trimesic acid, pyromellitic acid, pyromellitic dianhydride, 3,3'4,4'-benzophenone tetracarboxylic dianhydride, etc. These acids should not be included in the backbone portion of the polyester diol resin since they tend to lead to premature gellation of the polyester resin. The pendant polycarboxylic acids contribute to the water-solubility of the polyester resin and the removeability from yarns in alkaline desizing baths. Further, the aromatic nucleus of these acids promotes adhesion of the polyester resin composition to the polyester yarn blends.

In somewhat greater detail the backbone linear polyester having an acid number of less than 3 can be produced by condensing substantially all of the dihydric alcohols and substantially all of the dicarboxylic acid compounds. The mole ratio of dihydroxy compound to dicarboxylic acid compound is about 5:4. The hydroxyl:carboxyl ratio must be at least 1 in order to provide terminal or internal hydroxyl groups in the linear polyester for reaction in the second stage with the polycarboxylic acid compound having at least 3 acyl groups. After the polyester backbone having an acid number of less than 3 is produced, the polycarboxylic acid compound having at least three acyl groups is condensed in the second stage to provide a water-soluble non-linear polyester having an acid number of at least 15, preferably 15 to 55. Typically, the preferred backbone polyester is formed by condensing the reactants at 200° L to 260° C. until the polyester has an acid number of less than 3, and then a poly acid compound is reacted at about 150° C. to about 225° C. until a polyester having an acid number of at least 15 is formed.

Any of the polyesters of this invention can be reduced into water or aqueous medium containing co-solvent or in co-solvent and/or base prior to blending with starch if starch is used. Suitable co-solvents include alcohols, such as butanol, pentanol, diethylene glycol monomethyl ether, propylene glycol-mono-propyl ether, etc. Suitable bases include ammonia, morpholine, alkali metal (sodium or potassium) hydroxides, etc.

The following two stage schematic illustrates preparation of polyester resins of the instant invention.

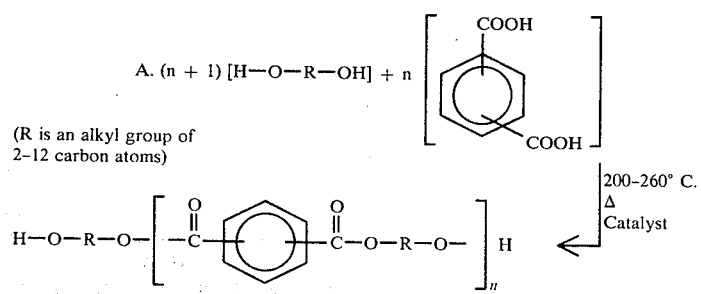

Acid Number 3
This isopolyester diol above is
symbolized as H—O—I—OH

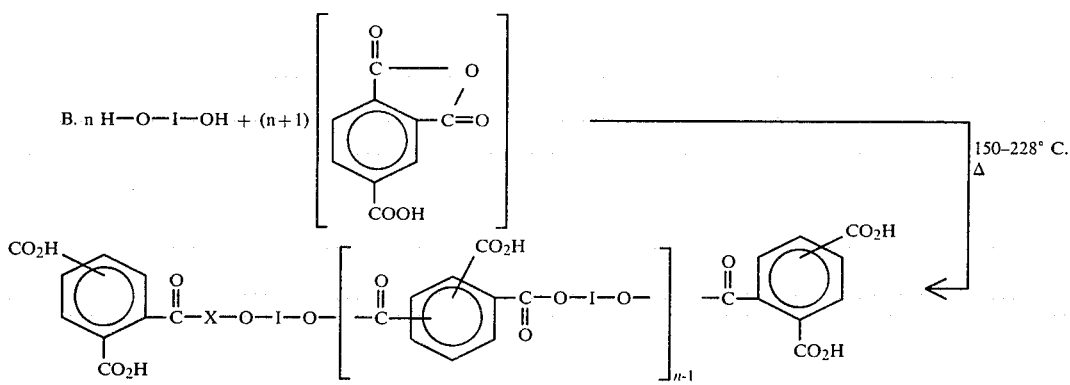

The final properties of the polymer are dependent upon the ratio of polyester diol/triacyl compound utilized in the second stage of esterification. For example, the following formulation has been processed.

|  |  | Moles | Remarks |
|---|---|---|---|
| Stage A | Diethylene Glycol (DEG) | 7 | To Acid Number 3 |
| Stage B | Isophthalic Acid (IPA) | 6 | |
|  | Ratio DEG/IPA | | |
|  | 7/6 DEG/IPA | 20 | To Acid Number 42–46 |
|  | Trimellitic Anhydride (TMA) | 21 | |

The theoretical acid number of this linear polyester is calculated to be 37.8 at the theoretical molecular weight of 34130. Actual molecular weight at the 42–46 acid number is lower than theoretical molecular weight. Due to temperature and stearic considerations, the third carboxyl group of TMA does not preferentially participate in the second stage.

Processing of the first stage of the process can be by conventional techniques with or without catalyst. Use of a catalytic procedure reduces time required for the process. Typical catalysts which can be used are titanates and/or tin compounds. Examples are tetraisopropyl titanate, tetraisobutyl titanate, butyl stannoic acid, stannous oxide and stannous oxalate. The second stage has not demonstrated any sensitivity to catalysis. Acid values of the first stage were determined by conventional techniques using methanolic potassium hydroxide in acetone. Acid values of the second stage were determined in tetrahydrofuran, dioxane or dimethylsulfoxide. Acetone was not a suitable solvent for the second stage due to insolubility of the polyester resin in the solvent.

It is essential that the polyester resins of the instant invention have molecular weights within the intermediate range of from about 5000 to 35000. Molecular weights below 5000 tend to produce polyesters without the required hardness and film strength. Polyesters of molecular weight above 35,000 are too viscous for easy handling in commercial equipment. The stoichiometric ratios of the dicarboxylic acid to prepolyester diol are consequently critical to the practice of this invention. Use of mole ratios of acid to diol below 4:5 in the preparation of the prepolyester diol promotes gellation of the second stage polyester. Reaction temperature in preparation of the non-linear polyester is also critical. The formation of the non-linear polyester from the linear prepolyester and polyacyl compound is dependent upon effectively reacting only two of the available carboxyl groups of the polyacyl moiety. Use of a temperature greater than 228° C. in the final polymerization step causes a third carboxyl group to react and produce an intractable resin.

The following examples are merely illustrative and should not be construed as limiting the scope of the invention.

EXAMPLE I

A polyester suitable for use in this invention was prepared by adding 996 gms (6 moles) isophthalic acid, 742 gm (7 moles) diethylene glycol to a kettle equipped with reflux condenser, thermometer and nitrogen sparge. 0.1% butyl stannoic acid (1.7 gm) was added as catalyst. The composition was heated to 350° F. over a period of 2 hours and then to 450° F. for over the next hour. The reactor pot temperature was maintained at 450° F. for a total of 12 hours at which time the acid number of the linear polyester resin had reached 2. After the polyester, having an acid number of 2.0, was cooled to 350° F., 201.6 gm (1.05 moles) trimellitic anhydride was added to the reactor and the reactor temperature was maintained at 390° to 400° F. for a period of approximately 7 hours to provide a non-linear polyester having an acid number of 42 to 45. The polyester was cooled and dissolved in secbutanol to form an 80% solid solution, neutralized to pH 5.8 to 6.5 with a combination of 5% ammonium hydroxide and sodium hydroxide and then reduced to 30% solids with water.

Three mil films (wet) of the 30% dispersions were applied to 1 mil polyethylene terephthalate (PET) films at room temperature and allowed to dry for 40–60 minutes at room temperature. After this drying cycle, the dried polyester films were tested for adhesion to the substrate by creasing the films completely in both an inward fold and an outward fold. The crease was then carefully examined to determine if any degree of cracking, crazing or loss of adhesion of the cast film was apparent from the film substrate. Utilizing this method of evaluation, the polyester resins based upon IPA/DEG/TMA demonstrated excellent adhesion to the substrate without any indications of failure at relative humidity conditions of 50% and above. The performance of the dried films on the PET substrate demonstrated dramatic losses in film strength and adhesion when tested at humidity levels of less than 50%.

EXAMPLE II

Water dispersions of the intermediate molecular weight polyester resin prepared in Example I were padded on polyester fabric of 150 denier yarn to simulate the conditions existing after fabric formation is complete and size removal is required. A level of 6% resin solids was applied to the fabric. Samples of the fabric were subjected to a dry cycle (5 minutes at 120° C.) as well as a combination dry/cure cycle (5 minutes at 120° C./5 minutes at 150° C.). The second conditions simulated a fabric which is dried and subsequently subjected to heat setting conditions. The dried resin on fabric was then removed utilizing conventional desizing procedures. The conventional method utilized a 2 gpl level of soda ash and 0.5 gpl of a nonionic emulsifier with the fabric immersed in the solution for a period of 30 seconds followed by two 30 second rinses in clean water. All three of these baths were maintained at a temperature above 190° F. Removal of the size was then verified by dyeing the scoured fabric with a blue dye which attaches to basic sites. The absence of dye take-up in this test verfied the complete removal of the size. Both dried only and dried and heat set resin on fabric were completely removed via the conventional desize procedure.

EXAMPLE III

Water dispersions of the intermediate molecular weight resin prepared in Example I were padded onto polyester fabric of 150 denier yarn to determine the effect of a severe desize procedure on the removability of the polyester resin. The desizing procedure was repeated utilizing a two percent sodium hydroxide solution followed by two rinses in clean water. Complete removal of the sizing material was demonstrated by the basic blue dye test. This method of size removal demonstrates the lack of sensitivity of the intermediate molecular weight polyester resin to higher levels of electrolyte concentrations.

EXAMPLE IV

Water dispersions of the intermediate molecular weight resin prepared in Example I were padded onto polyester fabric of 150 denier yarn. The PET fabric was padded with a five percent bath of the IPA/DEG/TMA resin dispersion and the fabric was subjected to a conventional dry/cure cycle. The fabric was then subjected to five commercial cleaning cycles using perchlorethylene as the cleaning solvent. With no added crosslinking agents, this dry cleaning treatment left the finish on the fabric with only the expected degree of mechanical breakdown from the action of the dry cleaning cycles. The above results demonstrated the resin system of the instant invention to be unaffected by action of conventional dry cleaning solvents.

These fabrics were also subjected to five standard AATCC laundry cycles using both the standard AATCC detergent and phosphate containing commercial detergent. Again there was a degree of breakdown of the finish due to the mechanical action encountered in the washing machine and in the dryer, but the net effect was that the finish was nearly unaffected by the treatment. The mechanical breakdown of the finish was duplicated in the dryer by subjecting the unlaundered treated fabric to a dry cycle two times the total experienced by the fabric through five conventional AATCC laundry and dry cycles.

I claim:

1. A composition comprising water soluble non-linear polyester resin having a molecular weight within the range of from about 5000 to 35000 and (1) a backbone portion comprising a linear prepolyester having an acid number of less than 3 comprising the reaction product of dihydroxy compound and dicarboxylic acid compound in a mole ratio within the range from about 5:4 to about 1.01:1.0, and having a hydroxyl: carboxyl ratio of at least 1, the dihydroxy compound having at least one alkylene group of at least 2 carbon atoms and a molecular weight of no more than 250, and at least 50 percent of the dicarboxylic acid compound is provided by an aromatic dicarboxylic acid compound, and (2) internal and pendant carboxyl acid moieties comprising a polycarboxylic acid compound having at least 3 acyl moieties which provides from 5 to 75 equivalent percent of the acyl moieties in the polyester, wherein the mole ratio of said polycarboxylic compound to said prepolyester is within the range from about 5.4 to 1.01 to 1.0, and wherein the reaction temperature in preparation of said polyester is not greater than 228° C.

2. The composition of claim 1 wherein said polyester has an acid number of 15 to 55, and the mole ratio of said polycarboxylic acid compound to said prepolyester is about 20:19.

3. The composition of claim 1 wherein up to 50 equivalent percent of the acyl equivalents in the backbone portion of the polyester are provided by saturated aliphatic and cyclic aliphatic dicarboxylic acids.

4. The composition of claim 1 wherein said dihydroxy compound is selected from the group consisting of alpha, omega alkylene glycols containing 2 to 12 carbon atoms, 1,2-alkylene glycols containing 3 to 12 carbon atoms, 1,3-alkylene glycols, dihydroxydialkyl ethers of no more than one oxyethylene group.

5. The composition of claim 4 wherein said dihydroxy compound is selected from the group consisting of diethylene glycol and dipropylene glycol.

6. The composition of claim 1 wherein said dicarboxylic acid compound is isophthalic acid.

7. The composition of claim 1 wherein said dihydroxy compound is a polyoxyethylene glycol having a maximum molecular weight of 250.

8. The composition of claim 1 wherein said polycarboxylic acid compound comprises a trimellitic acid compound.

9. A process of warp-sizing polyester and polyester/cotton yarns which comprises padding said yarns with a composition comprising water soluble non-linear polyester resin having a molecular weight within the range of from about 5000 to 35000 and (1) a backbone portion comprising a linear prepolyester having an acid number of less than 3 comprising the reaction product of dihydroxy compound and dicarboxylic acid compound in a mole ratio within the range from about 5:4 to about 1.01:1.0, and having a hydroxyl:carboxyl ratio of at least 1, the dihydroxy compound having at least one alkylene group of at least 2 carbon atoms and a molecular weight of no more than 250, and at least 50 percent of the dicarboxylic acid compound is provided by an aromatic dicarboxylic acid compound, and (2) internal and pendant carboxyl acid moieties comprising a polycarboxylic acid compound having at least 3 acyl moieties which provides from 5 to 75 equivalent percent of the acyl moieties in the polyester, wherein the mole ratio of said polycarboxylic compound to said prepolyester is within the range from about 5:4 to about 1.01:1.0, and wherein the reaction temperature in preparation of said polyester is not greater than 228° C.

10. The process of claim 9 wherein said polyester has an acid number of 15 to 55, and the mole ratio of said polycarboxylic acid compound to said prepolyester is about 20:19.

11. The process of claim 9 wherein up to 50 equivalent percent of the acyl equivalents in the backbone portion of the polyester are provided by saturated aliphatic and cyclic aliphatic dicarboxylic acids.

12. The process of claim 9 wherein said dihydroxy compound is selected from the group consisting of alpha, omega alkylene glycols containing 2 to 12 carbon atoms, 1,2-alkylene glycols containing 3 to 12 carbon atoms, 1,3-alkylene glycols, dihydroxydialkyl ethers of no more than one oxyethylene group.

13. The process of claim 12 wherein said dihydroxy compound is selected from the group consisting of diethylene glycol and dipropylene glycol.

14. The process of claim 9 wherein said dicarboxylic acid compound is isophthalic acid.

15. The process of claim 9 wherein said dihydroxy compound is a polyoxyethylene glycol having a maximum molecular weight of 250.

16. The process of claim 9 wherein said polycarboxylic acid compound comprises a trimellitic acid compound.

17. An article comprising textile yarns carrying a warp size wherein said warp size comprises a composition comprising water soluble non-linear polyester resin having a molecular weight within the range of from about 5000 to 35000 and (1) a backbone portion comprising a linear prepolyester having an acid number of less than 3 comprising the reaction product of dihydroxy compound and dicarboxylic acid compound in a mole ratio within the range from about 5:4 to about 1.01:1.0 and having a hydroxyl:carboxyl ratio of at least 1, the dihydroxy compound having at least one alkylene group of at least 2 carbon atoms and a molecular weight of no more than 250, and at least 50 percent of the dicarboxylic acid compound is provided by an aromatic dicarboxylic acid compound, and (2) internal and pendant carboxyl acid moieties comprising a polycarboxylic acid compound having at least 3 acyl moieties which provides from 5 to 75 equivalent percent of the acyl moieties in the polyester, wherein the mole ratio of said polycarboxylic acid compound to said prepolyester is within the range from about 5:4 to about 1.01:1.0, and wherein the reaction temperature in preparation of said polyester is not greater than 228° C.

18. The composition of claim 17 wherein said polyester has an acid number of 15 to 55, and the mole ratio of said polycarboxylic acid compound to said prepolyester is about 20:19.

19. The composition of claim 17 wherein up to 50 equivalent percent of the acyl equivalents in the backbone portion of the polyester are provided by saturated aliphatic and cyclic aliphatic dicarboxylic acids.

20. The composition of claim 17 wherein said dihydroxy compound is selected from the group consisting of alpha, omega alkylene glycols containing 2 to 12 carbon atoms, 1,2-alkylene glycols containing 3 to 12 carbon atoms, 1,3-alkylene glycols, dihydroxydialkyl ethers of no more than one oxyethylene group.

21. The composition of claim 20 wherein said dihydroxy compound is selected from the group consisting of diethylene glycol and dipropylene glycol.

22. The composition of claim 17 wherein said dicarboxylic acid compound is isophthalic acid.

23. The composition of claim 17 wherein said dihydroxy compound is a polyoxyethylene glycol having a maximum molecular weight of 250.

24. The composition of claim 17 wherein said polycarboxylic acid compound comprises a trimellitic acid compound.

* * * * *

UNITED STATES PATENT OFFICE
CERTIFICATE OF CORRECTION

Patent No. 4,268,645    Dated May 19, 1981

Inventor(s) John C. Lark

It is certified that error appears in the above-identified patent and that said Letters Patent are hereby corrected as shown below:

Column 5, Line 37

Patent reads "omega alylene glycol" and should read --omega alkylene glycol--.

Column 6, Line 38
Patent reads "200°L" and should read --200°--.

Column 7, Line 18 (Table)
Patent reads "$-\overset{O}{\underset{\|}{C}}-X-O-I-$" and should read --$-\overset{O}{\underset{\|}{C}}-O-I-$--.

Signed and Sealed this

Eighth Day of September 1981

[SEAL]

Attest:

GERALD J. MOSSINGHOFF

Attesting Officer — Commissioner of Patents and Trademarks